(12) United States Patent
Knudtson et al.

(10) Patent No.: US 6,398,283 B1
(45) Date of Patent: Jun. 4, 2002

(54) MOVABLE CARGO TRAY APPARATUS (75) Inventors: John E. Knudtson, Granger; David L. Ash, Warsaw; DeRay G. Steffensen, Goshen; Gene A. Dylewski, Granger; Nevin L. Martin, Jr., Goshen, all of IN (US)

(73) Assignee: Utilimaster Corporation, Makarusa, IN (US)

( * ) Notice: Subject to any disclaimer, the term of this patent is extended or adjusted under 35 U.S.C. 154(b) by 0 days.

(21) Appl. No.: 09/621,212

(22) Filed: Jul. 21, 2000

(51) Int. Cl.[7] ............................................... B60L 11/00
(52) U.S. Cl. ................................ 296/26.09; 414/522
(58) Field of Search ........................... 296/26.09, 37.6, 296/24.1, 37.1; 414/522

(56) References Cited

U.S. PATENT DOCUMENTS

| | | |
|---|---|---|
| 2,091,068 A | 8/1937 | Girl |
| 2,284,419 A | 5/1942 | Greig |
| 2,678,139 A | 5/1954 | Gildersleeve |
| 3,726,422 A | 4/1973 | Zelin |
| 4,685,857 A * | 8/1987 | Goeser et al. ............... 414/522 |
| 4,824,158 A * | 4/1989 | Peters et al. ................ 296/37.6 |
| 4,889,377 A * | 12/1989 | Hughes ....................... 414/522 |
| 4,950,123 A | 8/1990 | Brockhaus |
| 4,993,088 A | 2/1991 | Chudik |
| 5,046,913 A * | 9/1991 | Domek et al. ............... 414/522 |
| 5,064,335 A | 11/1991 | Bergeron et al. |
| 5,098,146 A | 3/1992 | Albrecht et al. |
| 5,513,941 A | 5/1996 | Kulas et al. |
| 5,934,725 A | 8/1999 | Bowers |
| 5,938,262 A | 8/1999 | Mills |
| 5,944,371 A | 8/1999 | Steiner et al. |
| 6,065,792 A * | 5/2000 | Sciullo et al. ........... 296/26.09 |

* cited by examiner

Primary Examiner—Stephen T. Gordon
Assistant Examiner—Jason Morrow
(74) Attorney, Agent, or Firm—Barnes & Thornburg (57) ABSTRACT

A vehicle having a movable cargo tray apparatus for the floor of the vehicle is provided. The apparatus having a base, bearing, a pair of longitudinally extending mounting rails, and at least one stop. The stop selectively engages the rail.

21 Claims, 8 Drawing Sheets

MOVABLE CARGO TRAY APPARATUS

FIELD OF THE INVENTION

The present invention relates to cargo transportation. More particularly, the present invention relates to facilities for assisting in the loading and unloading of cargo from a vehicle.

BACKGROUND AND SUMMARY OF THE INVENTION

Movable cargo beds are known in the art. Current designs, however, are complicated and do not serve well in professional or personal delivery vehicles. Delivery vehicles for mail and parcels present unique challenges for movable cargo trays because they are covered vehicles that require a balance between maximizing the amount of cargo to be stored in the vehicle while allowing a simple convenient mechanism with which an operator can remove cargo easily. Complicated structures occupy too much space in the vehicle that could otherwise be available for cargo. In addition, the only anticipated access point to the cargo area of such a vehicle is the rear access door. Any movable tray, thus, should allow the operator to selectively move the tray from this access door to any desired position relative to the vehicle.

It would be desirable to provide a movable cargo tray apparatus with a design for use in a delivery vehicle that can be moved to a selected position by an operator from a convenient access point of the vehicle. Furthermore, it will be desirable to provide a movable cargo tray apparatus that will removably lock in the selected positions so the operator can easily load or unload cargo from the tray.

Accordingly, the present invention provides a vehicle having a movable cargo tray apparatus for the floor of the vehicle. The apparatus comprises a base, bearings, a pair of longitudinally extending mounting rails and at least one stop. The base has spaced apart longitudinally extending sides and ends extending therebetween. The bearings extend from the sides of the base. The pair of mounting rails are spaced apart and attached to the floor of the vehicle. Each of the mounting rails faces one of the sides and each has a plurality of apertures disposed therethrough spaced apart along same. The stop extends from at least one of the laterally extending sides. In addition, the stop engages the rail and selectively extends through at least one of the apertures.

The movable cargo tray apparatus may provide a plurality of wheels in addition to the frame, at least one stop, and laterally extending mounting rails. The frame has spaced apart longitudinally extending sides and ends extending therebetween. The wheels extend from the sides of the frame. The stop extends from at least one of the laterally extending sides. The mounting rails are spaced apart and attached to the floor of the vehicle. Each of the rails are facing one of the sides. In addition, each of the rails comprise a first portion configured to receive the wheels, and a second portion configured adjacent the stop. Furthermore, the rails have a plurality of spaced apart apertures disposed therethrough configured to selectively receive the stop.

The movable cargo tray apparatus may further provide a base frame, a plurality of wheels, a pair of pins, and a pair of longitudinally extending mounting rails. The base frame has spaced apart longitudinally extending sides and ends extending therebetween. The longitudinally extending sides have front, intermediate and end portions. The plurality of wheels have at least one pair extending from each of the front intermediate and end portions of the sides. Each of the pins extend from one of the laterally extending sides. The pair of longitudinally extending mounting rails are spaced apart and each comprise a channel rail portion and a stop rail portion. The channel rail portion is configured to receive the wheels and comprises a longitudinally extending base, a longitudinally extending side wall upwardly extending therefrom, and a longitudinally extending cover substantially parallel to the base. The stop rail portion is configured to engage the pins and comprises a longitudinally extending side wall extending upwardly from the cover and includes at least one aperture disposed therethrough configured to selectively receive the pins.

A vehicle having a means for storing and moving cargo may also be provided. The means for storing and moving cargo comprises the following: a means for supporting cargo; a means for moving the means for supporting cargo; a means for restricting movement of the means for supporting cargo between first and second positions; and a means for selectively stopping the means for supporting cargo at said positions.

A method for storing and moving cargo from one portion of a vehicle to the other may further be provided. The method comprises: providing a support upon which cargo is stored; providing longitudinally extending rails attached to the vehicle along which the support selectively travels; selectively disengaging a stop mechanism that is coupled to the support and engagable with the rails; selectively moving the support to a plurality of locations along the rails; and selectively engaging the stop mechanism at one of the plurality of locations along the rails.

Additional features and advantages of the invention will become apparent to those skilled in the art upon consideration of the following detailed description of the preferred embodiment exemplifying the best mode of carrying out the invention as presently perceived.

BRIEF DESCRIPTION OF DRAWINGS

The present invention will be described hereafter with reference to the attached drawings which are given as non-limiting examples only, in which.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE DRAWINGS

Figure 1:
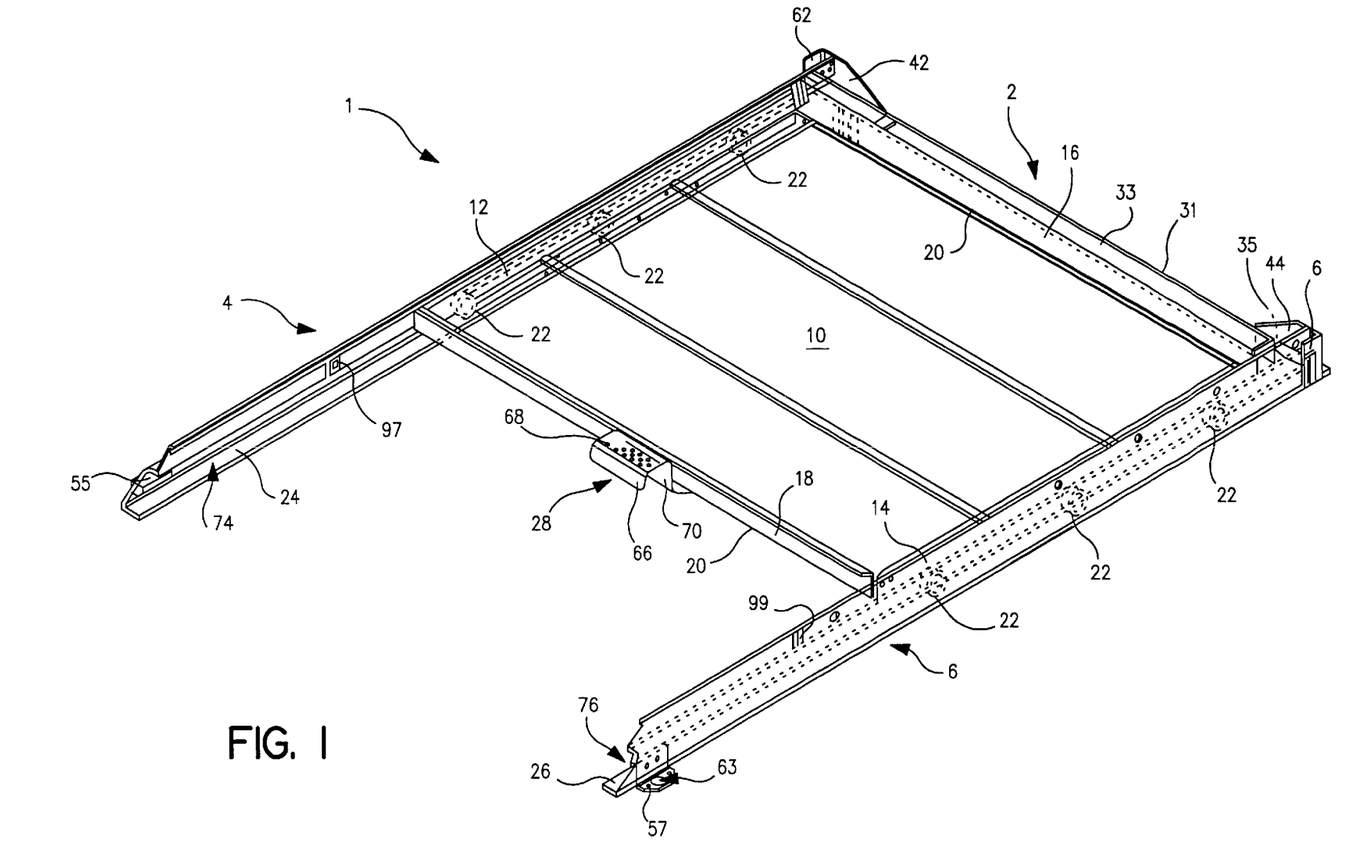
FIG. 1 is an isometric view of a movable cargo tray with portions of same shown in transparent view.
Figure 2:
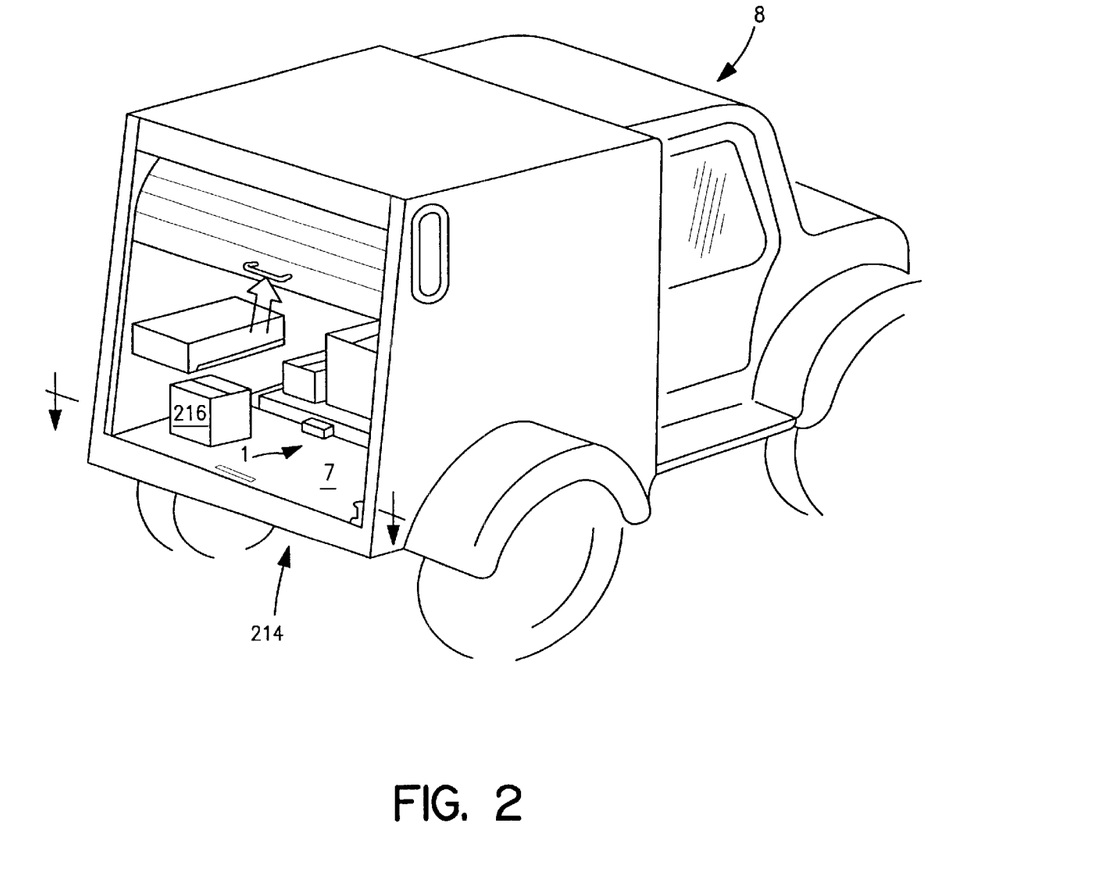
FIG. 2 is an isometric view of the roller tray of FIG. 1 inside a delivery vehicle.

As shown in FIGS. 1 and 2, a movable cargo tray apparatus 1 comprises a tray 2 movable within the confines of mounting rails 4, 6, configured to attach to the flooring 7 of a delivery vehicle 8. In the illustrated embodiment, tray 2 comprises a base panel 10 with longitudinally extending sides 12, 14 and ends 16, 18, extending therebetween appending from perimeter 20. (See also FIG. 3.) Wheels 22 are provided on tray 2, as will be discussed in further detail below, movable along the longitudinally extending bases 24, 26, of mounting rails 4,6, respectively.

Figure 3:
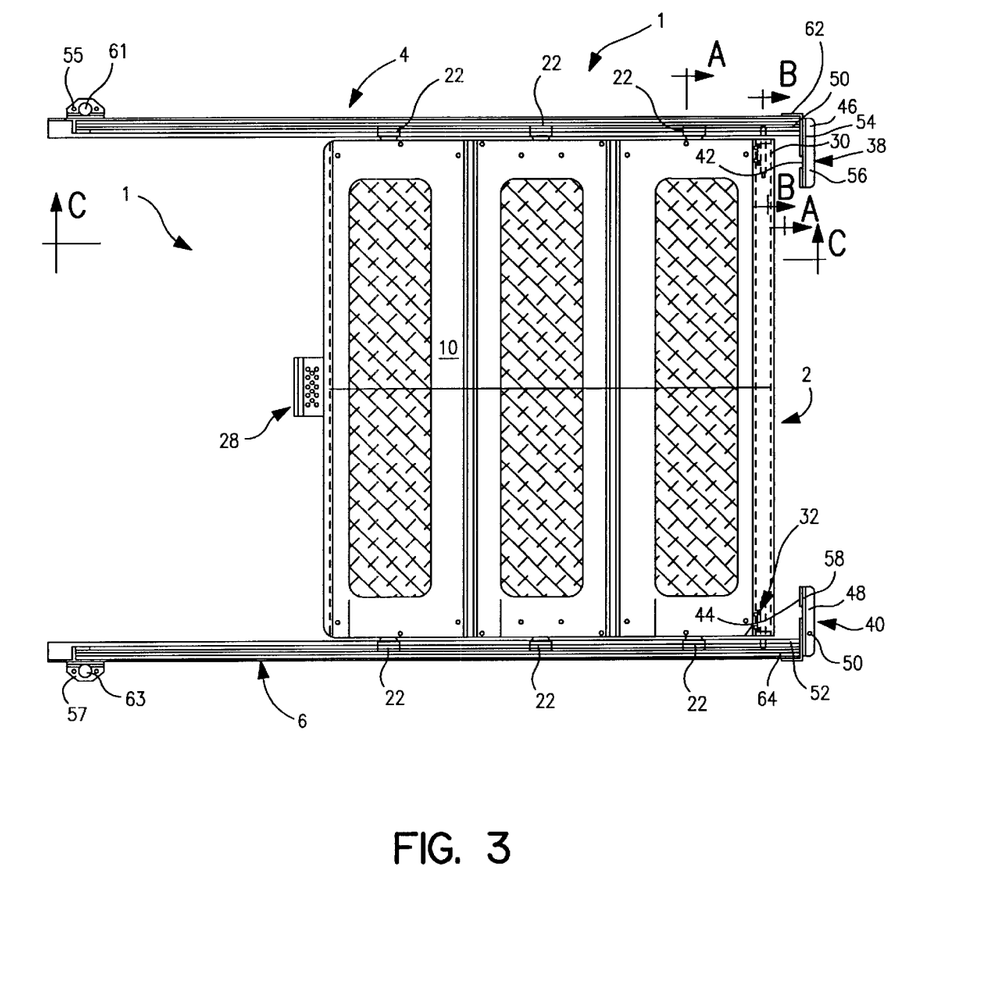
FIG. 3 is a top plan view of the movable cargo tray of FIG. 1.
Figure 7:
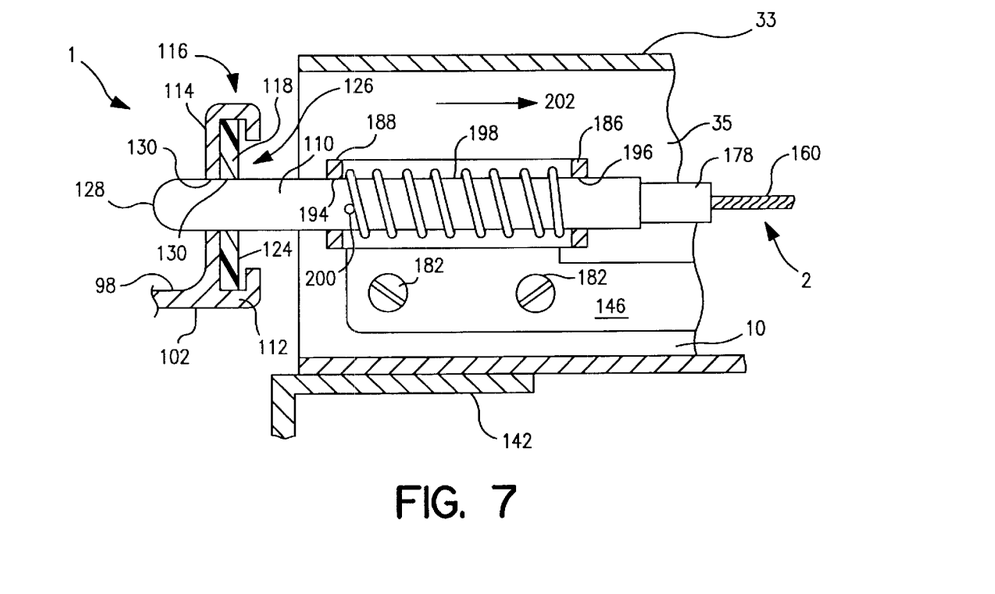
FIG. 7 is a cross sectional view of a portion of the movable cargo tray along the lines B—B of FIG. 3 showing detail of a portion of the stop mechanism in an extended position.

Tray 2 of movable tray apparatus 1, as shown in FIG. 3, also includes a handle 28, as well as stop pin mechanisms 30, 32 provided within stop pin housing 31 and extending laterally and adjacent rails 4, 6. Handle 28 comprises a grip portion 66 depending from a horizontally extending guard portion 68. An operator can either pull or push on grip portion 66 to move tray 2 either forward or backward. An attachment portion 70 depends from guard portion 68 opposite grip portion 66 for attaching to end, 18 of tray 2. A stop pin mechanism 72, as shown in FIG. 7, is partially coupled to handle 28 as will be discussed in greater detail below.

Stop pin mechanisms 30, 32 determine the extent to which tray 2 will move along rails 4, 6. As shown in FIG. 1, mechanisms 30, 32 are housed within housing 31. Housing 31 comprises end 16, top panel 33 extending therefrom and a rear end 35 depending from top panel 33 and extending generally parallel to end 16.

Back stops 38, 40 comprise a stop panel portion 42, 44 and a base portion 46, 48. (See also FIGS. 1 and 4.) Stop panel portions 42, 44 extend upwardly serving as an abuttment, limiting movement of tray 2 from extending beyond ends 50, 52 of rails 4, 6. Side panels 62, 64 extend vertically and generally perpendicularly from stop panel portions 42, 44. Panels 62, 64 are configured to attach to rails 4, 6, respectively, using a fastener like a bolt, a screw or some type of adhesive or weld. Base portions 46, 48, extend from portions 42, 44 and have apertures 54, 56, 58, 60, disposed therethrough. Apertures 54, 56, 58, 60, are configured to receive screws or bolts to attach rails 4, 6, to flooring 7. It is appreciated that any fastener or adhesive-type material that will attach-rails 4, 6, to flooring 7 may be used. In addition, rails 4, 6, include brackets 55, 57, with apertures 61, 63, disposed therethrough to receive screws or bolts as previously discussed. (See FIGS. 1, and 3.) It is appreciated, however, that rails 4, 6 may be attached directly to flooring 7 without the assistance of brackets 55, 57. For example, apertures may be disposed through bases 24, 26 and threaded screws or pins extended therethrough to attach to flooring 7.

Figure 4:
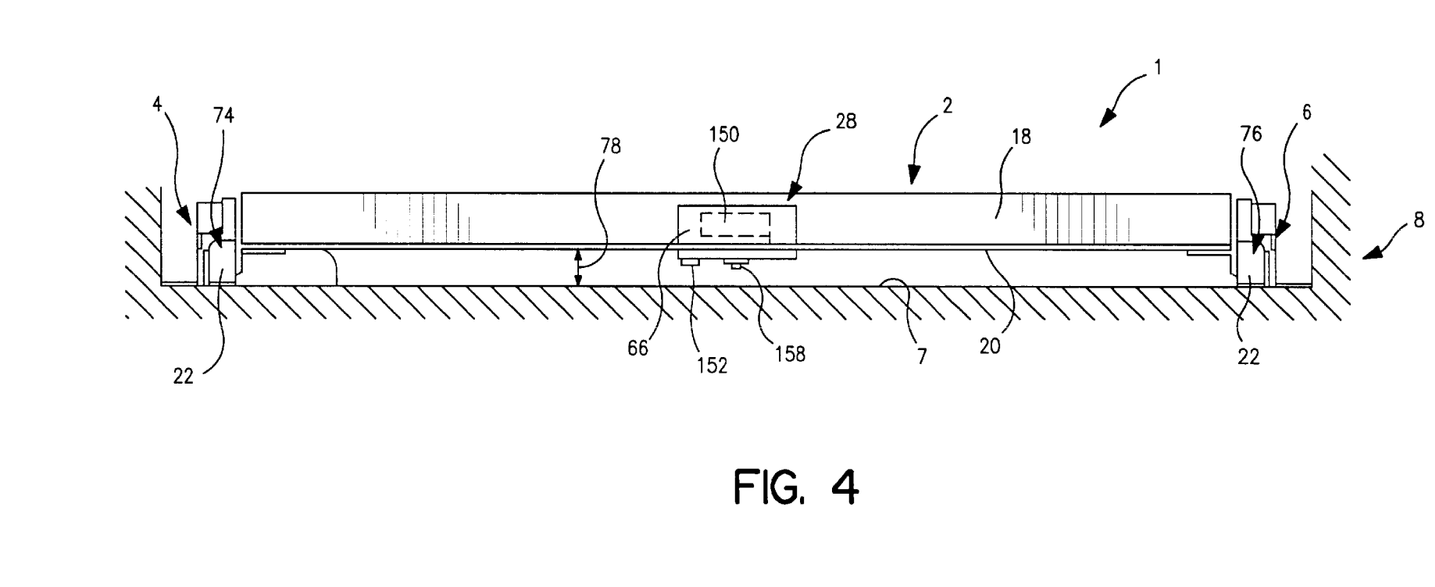
FIG. 4 is a front view of the movable cargo tray of FIG. 1.

As best shown in FIG. 4, tray 2 is cradled by rails 4,6 and flooring 7. Wheels 22, though movable along bases 24, 26, are not otherwise attached to wheel cavity portions 74, 76. As also shown in FIG. 4, tray 2 is raised above the flooring 7 by a distance 78. The distance tray 2 is raised above flooring 7, is dependent on the size of wheels 22 and the position of tray 2 relative to same.

Figure 5:
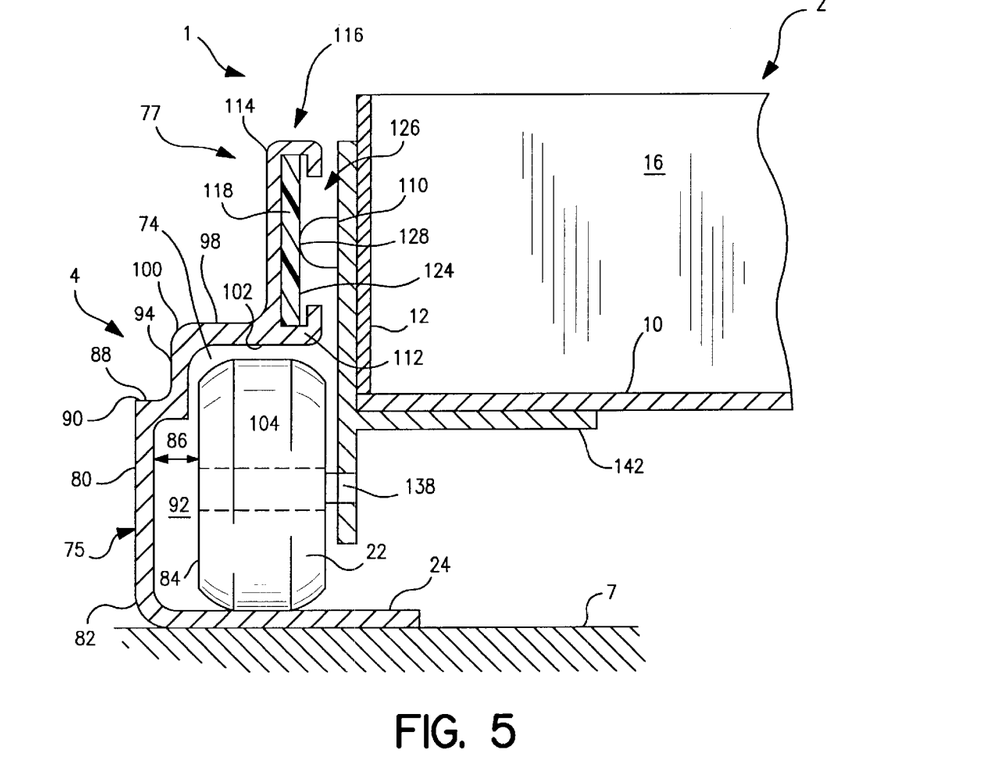
FIG. 5 is a front cross sectional view of a portion of the movable cargo tray along lines A—A of FIG. 3.

A cross sectional view of rail 4 with wheels 22 and tray 2 is shown in FIG. 5. Mounting rail 4 comprises two sections, a wheel rail portion 75, and a pin guide rail portion 77. For the wheel rail portion 75, base 24 is shown adjacent flooring 7 with a side wall 80 appending therefrom at corner 82. Side wall 80 is spaced apart from edge 84 of wheels 22 a distance 86 so as not to interfere with the travel of wheels 22 along base 24. An indent 88 extends from side wall 80 at corner 90 over base 24 forming a first cavity 92. Extending from indent 88 in a step-like manner is guard wall 94. Wall 94 provides a barrier which limits lateral movement of wheels 22. Contact between edge 84 and inner surface 96 of wall 94 maintains wheels 22 within rail 4. A cover wall 98 extends from wall 94 at corner 100. Cover wall 98 extends over base 24 providing an upper barrier limiting upward mobility of tray 2. As shown, contact between inner surface 102 of cover wall 98 and track surface 104 of wheels 22 maintains wheels 22 within rail 4. Base 24 and walls 80, 88, 94 and 98, form wheel cavity 74 within which each of wheels 22 and thus tray 2 has freedom of movement.

Extending upwardly from cover 98 of wheel rail portion 75 is pin guide rail portion 77. Pin guide rail portion 77 serves as a guide and stop for pin 110 of tray 2. In the illustrated embodiment, guide rail portion 77 has a generally "C" shaped cross section comprising a curled base 112 adjacent cover 98, an upwardly extending side wall 114, a curled top 116 and an opening 126. Positioned within the "C" shaped cross section of guide rail portion 77 is a glide block 118 longitudinally extending along the length of mounting rail 4. Tip 128 of pin 110 is biased against surface 124 by means discussed in greater detail below. As tray 2 moves between various positions relative to mounting rails 4, 6, as shown in FIGS. 9 through 12, the contact between tip 128 and surface 124, for example, provides a smooth glide during travel. In addition, as will also be discussed in greater detail hereafter below, apertures 130, 132, 134, 136 and 210 are disposed through both wall 114 and glide block 118 in a coaxial fashion. Such apertures are configured to receive pin 110 to limit movement of tray 2. (See FIG. 6, 9 through 12.) It is appreciated that a glide block (not shown), similar to glide block 118, including the apertures and operating in the same manner, is attached to rail 6. Stop shims 97, 99, are provided on the glide blocks to prevent movement of tray 2 beyond a certain-point. Shims 97, 99, extend from the glide blocks and contact pins 110, 144, if tray moves too far along rails 4, 6. This prevents tray 2 from being pulled out of rails 4, 6. (See FIG. 1.)

Wheels 22 are rotatably coupled to an axle 138 that extends through an upwardly extending plate 140 attached to side wall 12 as shown in FIG. 5. Extending outwardly from plate 140 is a plate 142 attached to base panel 10 providing strength thereto. Also shown in FIG. 5 is a portion of tray 2 including end 16, side 12 and base panel 10.

Figure 6:
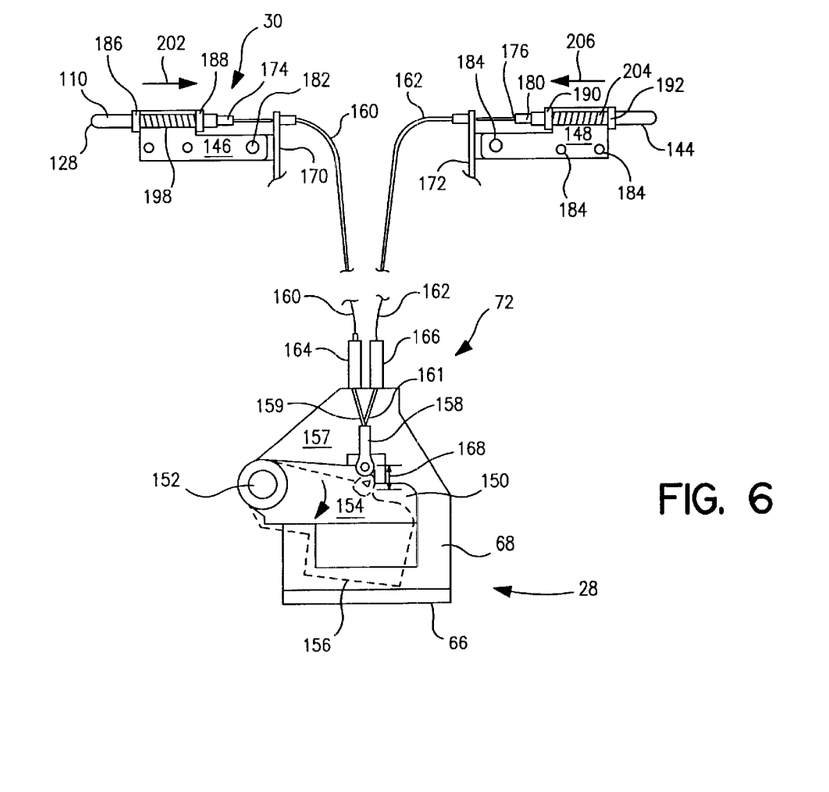
FIG. 6 is a detail view of the stop mechanism.

As previously discussed, tip 128 of pin 110 of mechanism 30, is biased against surface 124 as shown, for example, in FIG. 5. Stop pin mechanism 72 as shown in FIG. 6 moves pins 110, 144, relative to sides 12, 14, respectively. Mechanism 72 comprises a handle lever 150 that is pivotally coupled to handle 28 via pivot fastener 152. Handle 28 is fixedly attached to tray 2 so that the operator can grasp both handle 28 and lever 150 concurrently. Lever 150 comprises a grip portion 151 spaced apart and generally parallel to grip 66 of handle 28. Extending from grip 151 is a horizontally extending guard portion 153 spaced apart and generally parallel to horizontally extending guard portion 68 of handle 28. An attachment portion 155 depends from guard portion 153 opposite grip portion 151 that attaches to panel portion 157.

Lever 150 is movable in direction 154 to position 156 indicated by the hatched outline form of lever 150, as shown in FIG. 6. Lever 150 is also attached, at panel portion 157, to a link 158 which moves as lever 150 moves, indicated by hatched outline 156 form of link 158. Link 158 is attached to ends 159, 161 of cables 160, 162. In the illustrated embodiment, for protection of cables 160, 162, each are encased in housing tubes 164, 166 which extend from handle 28 to "L" brackets 170, 172. Accordingly, as lever 150 is moved in direction 154 a distance 168, cables 160, 162, move a comparable distance relative to brackets 170, 172, as well.

Pins 110, 144, are attached to ends 174, 176, of cables 160, 162. As shown in FIG. 7, for example, end 174 is attached to pin 110 using a clasp 178. A similar clasp 180 is used to attach end 176 of cable 162 to pin 144. "R" brackets 146, 148 attached to "L" brackets 170, 172 at 182, 184, respectively, comprise guides 186, 188 and 190, 192 to receive pins 128, 144. As shown in FIG. 7, for example, guides 186, 188 include apertures 194, 196, through which pin 110 is extended. A spring 198 is attached to pin 110 at 200 and disposed around same between guides 186, 188. Spring 198 causes a bias against pin 110 opposite direction 202, as shown in FIG. 6. This maintains pins 110 within apertures 194, 196. Similarly, a spring 204 is attached to pin 144 between guides 190, 192, as generally shown in FIG. 6. Spring 204 causes a bias against pin 144 opposite direction 206. As lever 150 moves in direction 154, cables 160, 162, also move causing pins to move inward in directions 202, 206, respectively, to retract pins 110, 144, as illustratively shown in FIG. 8.

Figure 8:
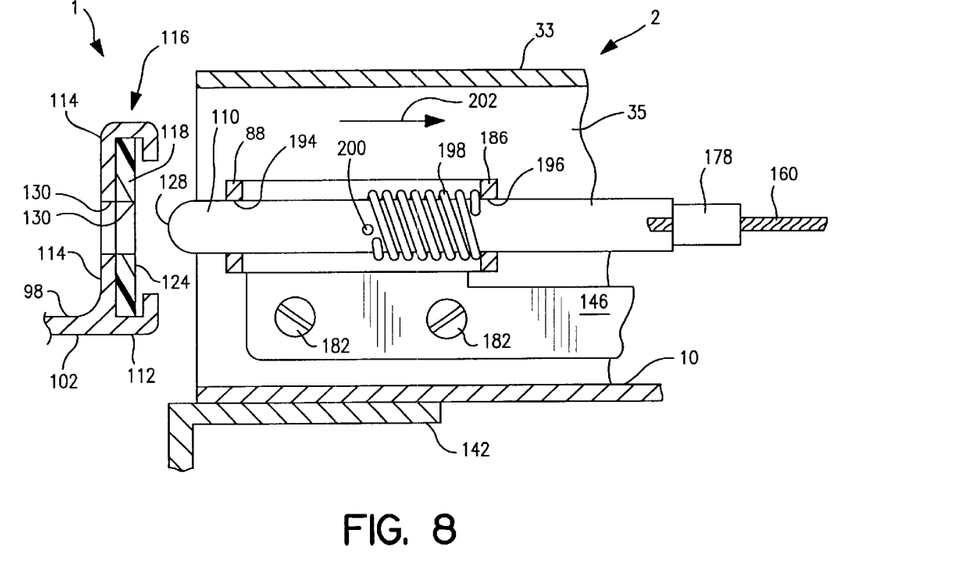
FIG. 8 is another cross sectional view of a portion of the movable cargo tray along the lines B—B of FIG. 3 showing detail of a portion of the stop mechanism in a retracted position.

The operation of mechanism 72 is illustrated in FIGS. 5, 7 and 8. In FIG. 5, as previously discussed, tip 128 of pin 110 is positioned adjacent surface 124. Spring 198 maintains a bias on pin 110 against surface 124. As tray 2 moves along rails 4, 6, pin 110 will encounter either apertures 130, 132, 134, 210 or 136. Because of the spring bias, pin 110 will be caused to extend through aperture 130, for example, which is coaxially disposed through both block 118 and side 114, when same is encountered. Pin 110 extending through aperture 130 has the affect of selectively limiting motion of tray 2 along rails 4, 6. Similarly, pin 144 will move into apertures 132, 134, 210 or 136 like pin 110.

In the illustrated embodiment, to allow tray 2 to move along rails 4, 6, pin 110 must be removed from apertures 130. Pin 110 is released from aperture 130 by moving pin 110 in direction 202 until tip 128 clears surface 124. As previously discussed with reference to FIG. 6, an operator moving lever 150 in direction 154 causes cables 160, 162, and thus pins 110, 144, to move in directions 202, 206, respectively. Shown in FIG. 8 is tip 128 of pin 110 cleared from aperture 130 thereby allowing tray 2 to move along rails 4, 6. In the illustrated embodiment, as cable 160 is moved in direction 202 as is pin 110, spring 198 is compressed. Accordingly, tray 2 is movable along rails 4, 6, so long as pin 110 (or 144, for that matter) is not aligned with either apertures 130, 132, 134, 136 or 210. This is true even if the operator does not move lever 150. When the operator releases lever 150, bias from spring 198 (204) will cause pin 110 (144) to move against block 118, as shown in FIG. 5. Pin 110 will remain adjacent block 118 as tray 2 moves while not impeding its movement. It is appreciated that the afordescribed process is applicable for extending pin 144 through apertures 130, 132, 134, 136 and 210 as well.

Figure 9:
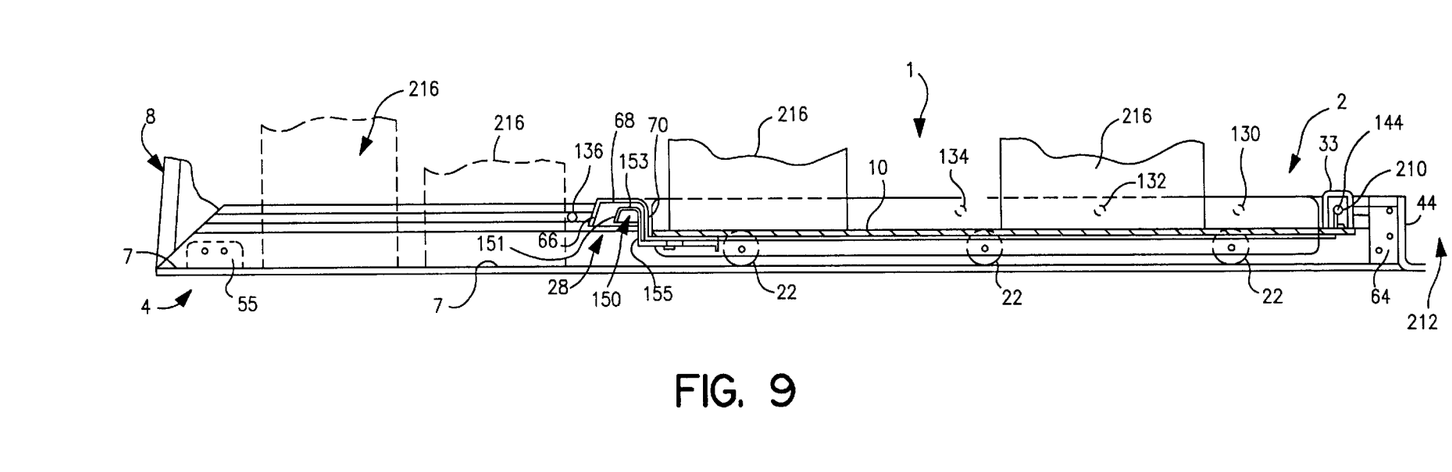
FIG. 9 is a side cross sectional view of the movable cargo tray along the lines C—C of FIG. 3.
Figure 10:
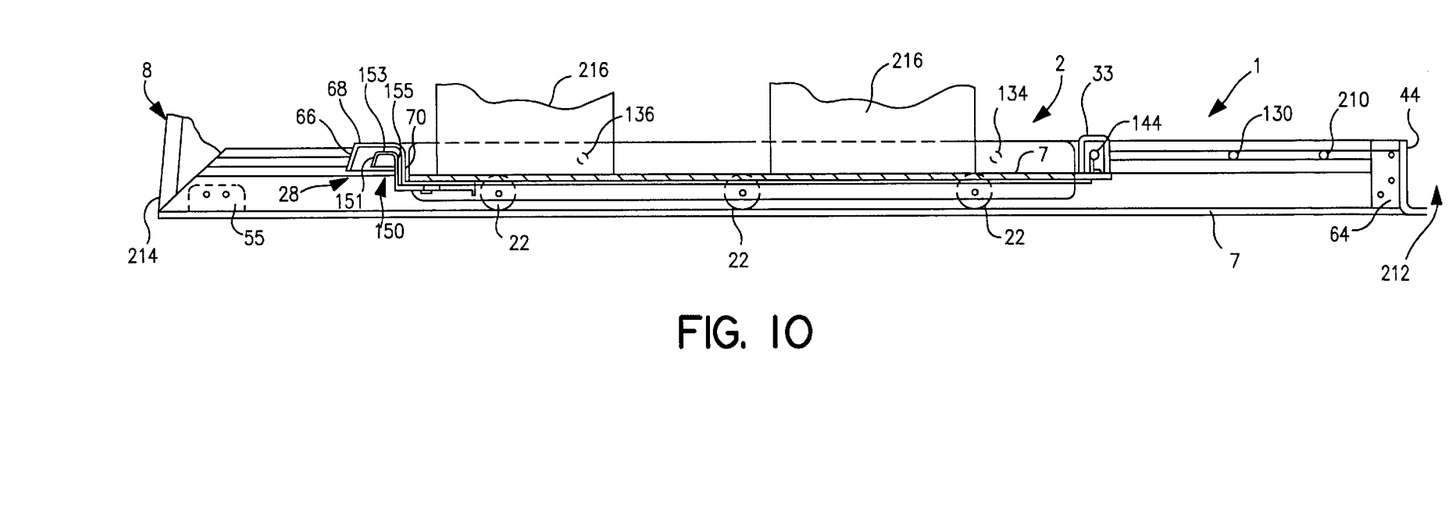
FIG. 10 is a side cross sectional view of the movable cargo tray of FIG. 9 moved to a first position.

Tray 2 is movable relative to rails 4, 6, between a variety of useful positions as shown in FIGS. 9 through 12. Specifically, in the illustrated embodiment, tray 2 is movable between a fully retracted position with pins 110, 144, extended through apertures 210 near the front end 212 of the vehicle 8 to a fully extended position partially beyond rails 4, 6, with pins 110, 144, extended through apertures 136 at the rear end 214 of vehicle 8. (Compare FIGS. 9 and 12) In the fully retracted position, as shown in FIG. 9, cargo 216 can be placed on both tray 2 and flooring 7. In use, cargo 216 can be placed on flooring 7 which then can be removed from vehicle 8 first. Cargo 216 placed on tray 2 can subsequently be removed. This allows cargo 216 to be moved without the operator having to reach too far into the rear end 214 of vehicle 8. After cargo 216 resting on flooring 7 is removed, the operator, by the method previously described, grasping lever 150 thereby moving pins 110, 144, in direction 202, 206, respectively, can pull tray 2 closer to the rear of vehicle 8, as shown in FIG. 10. This allows the operator better access to cargo placed nearer the front 212.

Figure 11:
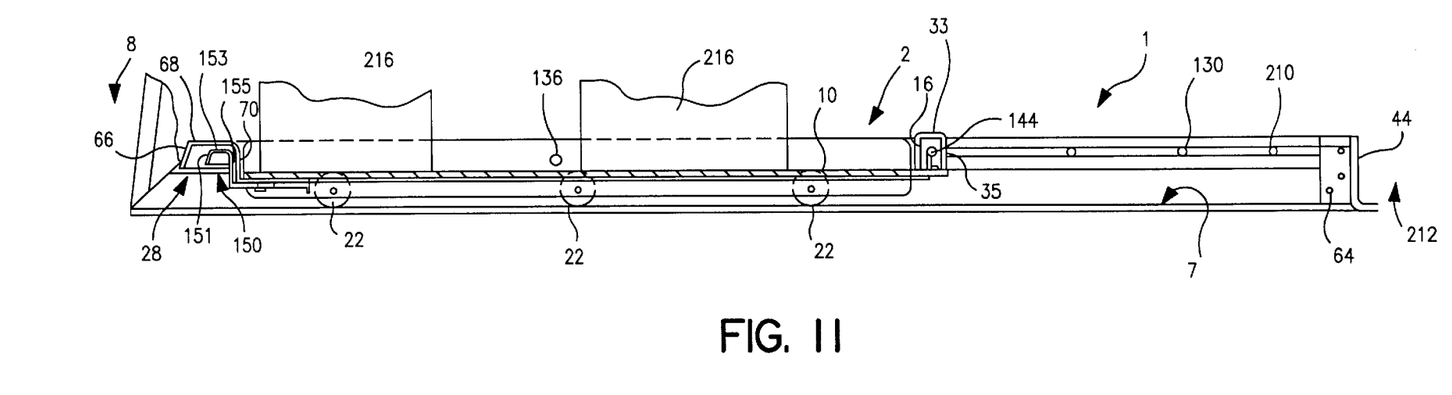
FIG. 11 is a side cross sectional view of the movable cargo tray of FIG. 9 moved to a second position.
Figure 12:
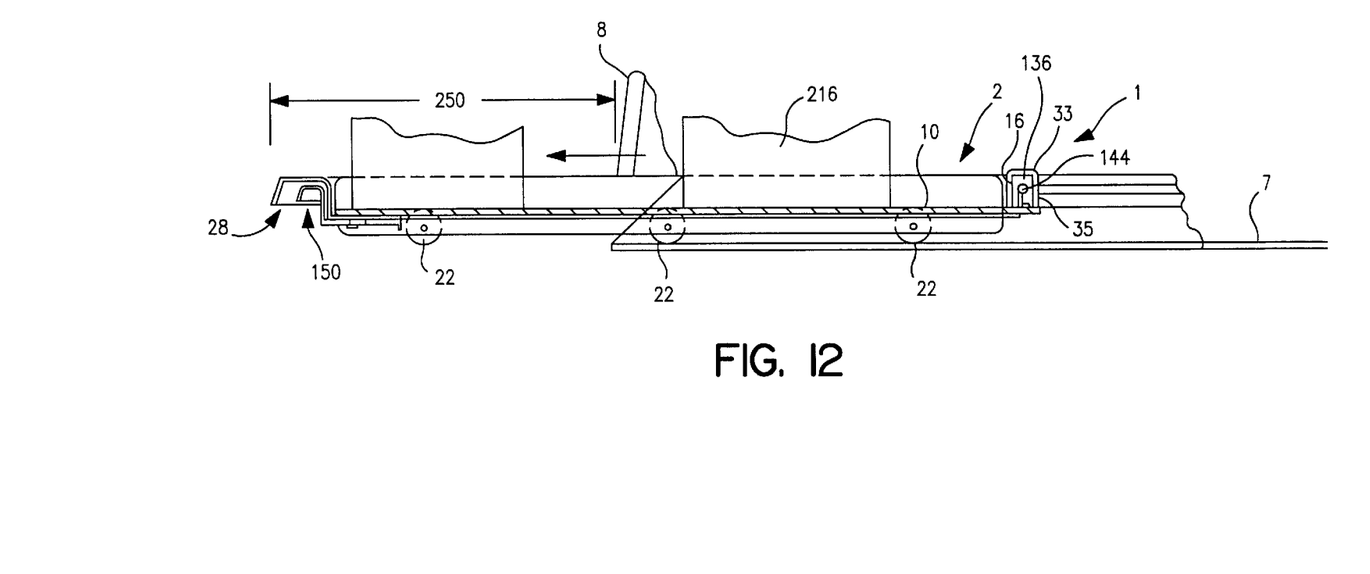
FIG. 12 is a side cross sectional view of the movable cargo tray of FIG. 9 moved to an extended position.

Tray 2 is movable to various positions along flooring 7, as previously discussed. In FIG. 10, the position of tray 2 relative to rear end 214 of vehicle 8 is shown. Similarly, FIG. 11 shows tray 2 even closer to end 214 with pin 144 extended through aperture 134. FIG. 12 shows tray 2 fully extended such that a portion tray 2 including at least one pair of wheels 22 and handle 28 extend beyond rear end 214 of vehicle 8 a distance indicated by reference numeral 250. This position, specifically, allows the operator to load or unload cargo 216 outside the confines of vehicle 8.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. A vehicle having a movable cargo tray apparatus for the floor of the vehicle, the apparatus comprising:
   a base having spaced apart longitudinally extending sides and ends extending therebetween;
   bearings extending from the sides of the base;
   a pair of longitudinally extending mounting rails spaced apart and attached to the floor of the vehicle each facing one of the sides and each having a plurality of apertures disposed therethrough spaced apart along the rails; and
   at least one stop extending from at least one of the laterally extending sides;
   wherein the stop engages the rail and selectively extends through at least one of the apertures; and
   wherein each of the mounting rails comprises a first rail for receiving the bearings and a second rail for receiving the stop.

2. The apparatus of claim 1, wherein the bearings are a plurality of wheels.

3. The apparatus of claim 1, wherein the wheels and stop are spaced apart to allow a portion of base frame to extend outwardly from the mounting rails.

4. The apparatus of claim 3, wherein the apertures are spaced apart on the rails to position the base frame relative to the mounting rails between first, second and third positions.

5. The apparatus of claim 4, wherein the first, second and third positions are storage, intermediate and extended positions.

6. The apparatus of claim 1, wherein the stop comprises a plurality of stops.

7. The apparatus of claim 6, further comprising a longitudinally extending slide block attached to each mounting rail adjacent the stops.

8. The apparatus of claim 7, wherein each of the mounting rails comprise a first portion and a second portion.

9. The apparatus of claim 8, wherein the first portion is configured to receive the bearings and the second portion is configured to receive the stops.

10. The apparatus of claim 1, wherein the first rail is longitudinally extending and positioned adjacent the floor, and the second rail is longitudinally extending and positioned adjacent the first rail opposite the floor.

11. The apparatus of claim 1, further comprising a handle attached to the base.

12. The apparatus of claim 1, further comprising a stop release coupled to the base and being engagable with the stop selectively moving same between a first position to engage at least one of the mounting rails and a second position to extend through at least one of the apertures.

13. A vehicle having a movable cargo tray apparatus for the floor of the vehicle, the apparatus comprising:
   a frame having spaced apart longitudinally extending sides and ends extending therebetween;
   a plurality of wheels extending from the sides of the frame;
   at least one stop extending from at least one of the laterally extending sides;
   a pair of longitudinally extending mounting rails spaced apart and attached to the floor of the vehicle each facing one of the sides and each comprising a first portion configured to receive the wheels and a second portion configured adjacent the stop and having a plurality of spaced apart apertures disposed therethrough configured to selectively receive the stop; and
   wherein the first portion is a first rail and the second portion is a second rail.

14. The apparatus of claim 13, wherein the second portion includes a longitudinally extending bearing surface positioned adjacent the stop and including apertures disposed therethrough coaxially aligned with the apertures in the second portion.

15. The apparatus of claim 13, wherein the bearing surface is a slide block coupled to the second portion.

16. The apparatus of claim 15, wherein the stop is biased against the slide block.

17. The apparatus of claim 13, wherein the first rail is positioned adjacent the floor, and the second rail is positioned adjacent the first rail.

18. A vehicle having a movable cargo tray apparatus for the floor of the vehicle, the apparatus comprising:
   a base frame having spaced apart longitudinally extending sides and ends extending therebetween, the longitudinally extending sides having front, intermediate and end portions;
   a plurality of wheels with at least one pair extending from each of the front, intermediate and end portions of the sides;
   a pair of pins each extending from one of the laterally extending sides; and
   a pair of longitudinally extending mounting rails spaced apart, each comprising a channel rail portion and a stop rail portion, the channel rail portion is configured to receive the wheels and comprises a longitudinally extending base, a longitudinally extending side wall upwardly extending therefrom and a longitudinally extending cover substantially parallel to the base, the stop rail portion is configured to engage the pins and comprises a longitudinally extending side wall extending upwardly from the cover and includes at least one aperture disposed therethrough configured to selectively receive the pins.

19. The apparatus of claim 18, further comprising a longitudinally extending slide block attached to side wall of the stop rail.

20. The apparatus of claim 19, wherein the pins are biased against the side wall of the stop rail.

21. A method for storing and moving cargo from one portion of a vehicle to the other, comprising:
   providing support upon which cargo is stored;
   providing longitudinally extending rails attached to the vehicle along which the support selectively travels;
   the longitudinally extending rails each comprise a first rail and a second rail, the first rail receives the support and the second rail receives the stop mechanisms;
   selectively disengaging the stop mechanism that is coupled to the support and engageable with the rails;
   selectively moving the support to a plurality of locations along the rails; and
   selectively engaging the stop mechanism at one of the plurality of locations along the rails.

* * * * *